(12) United States Patent
Cascione (10) Patent No.: US 12,048,611 B2
(45) Date of Patent: Jul. 30, 2024

(54) DENTAL IMPLANT PROSTHESIS

(71) Applicant: OPERART LLC, Santa Monica, CA (US)

(72) Inventor: Domenico Cascione, Santa Monica, CA (US)

( * ) Notice: Subject to any disclaimer, the term of this patent is extended or adjusted under 35 U.S.C. 154(b) by 0 days.

(21) Appl. No.: 14/990,751

(22) Filed: Jan. 7, 2016

(65) Prior Publication Data
US 2016/0199160 A1    Jul. 14, 2016

Related U.S. Application Data

(60) Provisional application No. 62/101,353, filed on Jan. 8, 2015.

(51) Int. Cl.
*A61C 8/00* (2006.01)

(52) U.S. Cl.
CPC .......... *A61C 8/0095* (2013.01); *A61C 8/0048* (2013.01)

(58) Field of Classification Search
CPC ... A61C 8/0048; A61C 13/102; A61C 8/0095; A61C 13/225; A61C 13/01; A61C 13/0025; A61C 13/2255; A61C 13/265–2656; A61C 13/1102; A61C 13/1225; A61C 13/275; A61C 8/0027; A61C 8/0028
See application file for complete search history.

(56) References Cited

U.S. PATENT DOCUMENTS

| | | | |
|---|---|---|---|
| 4,085,506 A | 4/1978 | Lew | |
| 4,767,328 A * | 8/1988 | Branemark | A61C 8/0048 433/168.1 |
| 4,931,016 A * | 6/1990 | Sillard | A61C 8/0048 433/167 |
| 5,221,204 A * | 6/1993 | Kruger | A61C 1/084 433/172 |
| 5,503,557 A | 4/1996 | Sillard | |
| 5,567,155 A | 10/1996 | Hansen | |
| 5,630,717 A | 5/1997 | Zuest et al. | |

(Continued)

FOREIGN PATENT DOCUMENTS

WO    WO 2014117871    8/2014

OTHER PUBLICATIONS

International Search Report and Written Opinion of Patentability of the International Search Authority for PCT/US2016/012614 (a PCT application of U.S. Appl. No. 14/990,751), Jul. 1, 2016.

*Primary Examiner* — Jacqueline T Johanas
*Assistant Examiner* — Shannel Nicole Belk
(74) *Attorney, Agent, or Firm* — RISSO I.P.

(57) ABSTRACT

Described is a two-part, screw retained dental implant prosthesis. The dental implant prosthesis includes both a primary substructure (made of for example, titanium) and a secondary superstructure (made of for example, zirconia). The primary substructure includes a top side and a bottom side, with substructure holes passing through the primary substructure from the top side to the bottom side. The primary substructure is formed to align with and secure against a dental implant as affixed in a patient's jaw. Alternatively, the secondary superstructure is formed to be affixed with the primary substructure. Thus, the primary substructure can be affixed with the dental implant, with the secondary superstructure thereafter being affixed with the primary substructure.

4 Claims, 6 Drawing Sheets

(56) References Cited

U.S. PATENT DOCUMENTS

| | | |
|---|---|---|
| 6,250,924 B1 | 6/2001 | Luotio |
| 6,322,364 B1 | 11/2001 | Oshida et al. |
| 6,439,887 B2 | 8/2002 | Braanemark |
| 6,663,390 B2 | 12/2003 | Riley et al. |
| 6,692,254 B1 | 2/2004 | Kligerman et al. |
| 8,021,183 B2 | 9/2011 | Poirier |
| 8,137,103 B1 | 3/2012 | Freilich et al. |
| 8,459,934 B2 | 6/2013 | Freilich |
| 8,529,255 B2 | 9/2013 | Poirier et al. |
| 8,926,325 B2 | 1/2015 | Berger |
| 9,452,034 B1* | 9/2016 | Urquiola ................ A61C 13/01 |
| 10,383,709 B2* | 8/2019 | Giasson ............ A61C 13/0004 |
| 2002/0192620 A1* | 12/2002 | Jorneus ................ A61C 8/0048 |
| | | 433/173 |
| 2005/0032024 A1* | 2/2005 | Castellon ............ A61C 8/0048 |
| | | 433/172 |
| 2006/0223029 A1* | 10/2006 | Berger ................ A61C 13/275 |
| | | 433/172 |
| 2007/0031793 A1* | 2/2007 | Casement ............ A61C 8/0048 |
| | | 433/218 |
| 2011/0318708 A1 | 12/2011 | Gahlert |
| 2012/0189985 A1 | 7/2012 | Iglesias |
| 2012/0219929 A1* | 8/2012 | De Clerck ............ A61C 8/0048 |
| | | 433/174 |
| 2012/0225407 A1 | 9/2012 | Chen |
| 2013/0171586 A1 | 7/2013 | Anitua |
| 2014/0099600 A1* | 4/2014 | Harrison ................ A61C 8/005 |
| | | 433/173 |
| 2014/0106303 A1* | 4/2014 | Giasson ............ A61C 13/0004 |
| | | 433/173 |
| 2014/0134571 A1* | 5/2014 | Lemke ................ A61C 8/0048 |
| | | 433/174 |
| 2014/0147808 A1 | 5/2014 | Buurlage |
| 2014/0178839 A1* | 6/2014 | Berger ............... A61C 13/2255 |
| | | 433/173 |
| 2014/0272797 A1 | 9/2014 | Prestipino |
| 2015/0005918 A1 | 1/2015 | Benzon |
| 2015/0064653 A1* | 3/2015 | Grobbee ............ A61C 13/2656 |
| | | 433/199.1 |
| 2015/0272705 A1* | 10/2015 | Watson ................... A61C 1/084 |
| | | 433/173 |
| 2016/0022378 A1* | 1/2016 | Hansen ............ A61C 13/0001 |
| | | 433/219 |
| 2016/0278878 A1* | 9/2016 | Watson ................... A61C 13/01 |
| 2016/0317262 A1* | 11/2016 | Stobbe ................ A61C 8/0095 |
| 2017/0245971 A1* | 8/2017 | Uzawa ................ A61C 13/102 |
| 2018/0250102 A1* | 9/2018 | Schulter ................. A61C 1/084 |

* cited by examiner

DENTAL IMPLANT PROSTHESIS

CROSS-REFERENCE TO RELATED APPLICATIONS

This is a non-provisional application of U.S. Provisional Application No. 62/101,353, filed on Jan. 8, 2015.

BACKGROUND OF THE INVENTION

(1) Field of Invention

The present invention relates to dental implants and, more particularly, to a dental implant prosthesis that is formed of a two-part, screw retained implant supported prosthesis.

(2) Description of Related Art

Dental prostheses have long been known in the art. Historically, when an individual lose their teeth, they are often provided with dentures. The dentures are used to allow the individual to crush and eat normal foods while providing a somewhat natural appearance. A problem with existing dentures is that they are not incredibly strong and, importantly, are not permanent (i.e., they are removable). To provide a more permanent prosthetic, dental implant prostheses have been conceived that are permanently affixed with the user's jaw. While operable, existing prostheses are not as strong as desired and can be difficult to remove and examine should the need arise.

Thus, a continuing need exists for an improved dental implant prosthesis that is strong, stable, and easily removed for examination if needed.

SUMMARY OF INVENTION

The present invention is directed to dental implants and, more particularly, to a two-part, screw retained dental implant prosthesis. The dental implant prosthesis includes both a primary substructure (made of, for example, titanium) and a secondary superstructure (made of, for example, zirconia). The primary substructure includes a top side and a bottom side, with substructure holes passing through the primary substructure from the top side to the bottom side. The primary substructure is formed to align with and secure against a dental implant as affixed in a patient's jaw. Alternatively, the secondary superstructure is formed to be affixed with the primary substructure. Thus, the primary substructure can be affixed with the dental implant, with the secondary superstructure thereafter being affixed with the primary substructure.

In another aspect, the top side of the primary substructure includes fixture holes formed therein.

Further, the secondary superstructure includes a top side and a bottom side, with a channel formed in the bottom side, the channel being formed to receive and cover a portion of the primary substructure.

Additionally and in another aspect, the secondary superstructure includes superstructure holes formed therethrough, the superstructure holes formed to align with the fixture holes when the primary substructure is positioned within the channel of the secondary superstructure. Thus, the secondary superstructure can be affixed with the primary substructure using screws as passed through the superstructure holes and into the fixture holes.

In yet another aspect, the substructure holes passing through the primary substructure include at least two peripheral holes, with the primary substructure having a pair of extended cantilevered sections that extend beyond the two peripheral holes.

In another aspect, a fixture hole is formed in each cantilevered section.

In yet another aspect, inserts are affixed within the superstructure holes. The inserts are, for example, cylindrical titanium sleeves.

Finally, as can be appreciated by one in the art, the present invention also comprises a method for forming and using the invention described herein. For example, the method includes acts of affixing the primary substructure with the dental implant as affixed in a patient's jaw, such that the primary substructure is affixed with the dental implant using at least one screw that passes through at least one of the substructure holes and into the dental implant; and affixing the secondary superstructure with the primary substructure (via screws and/or adhesive). The method also includes acts of affixing a titanium insert in one or more of the superstructure holes and positioning a screw through at least one of the superstructure holes and into at least one of the fixture holes, and any other acts in accordance with the drawings and description submitted herewith.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to dental implants and, more particularly, to a dental implant prosthesis that is formed of a two-part, screw retained implant supported prosthesis. The following description, is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

Figure 1:
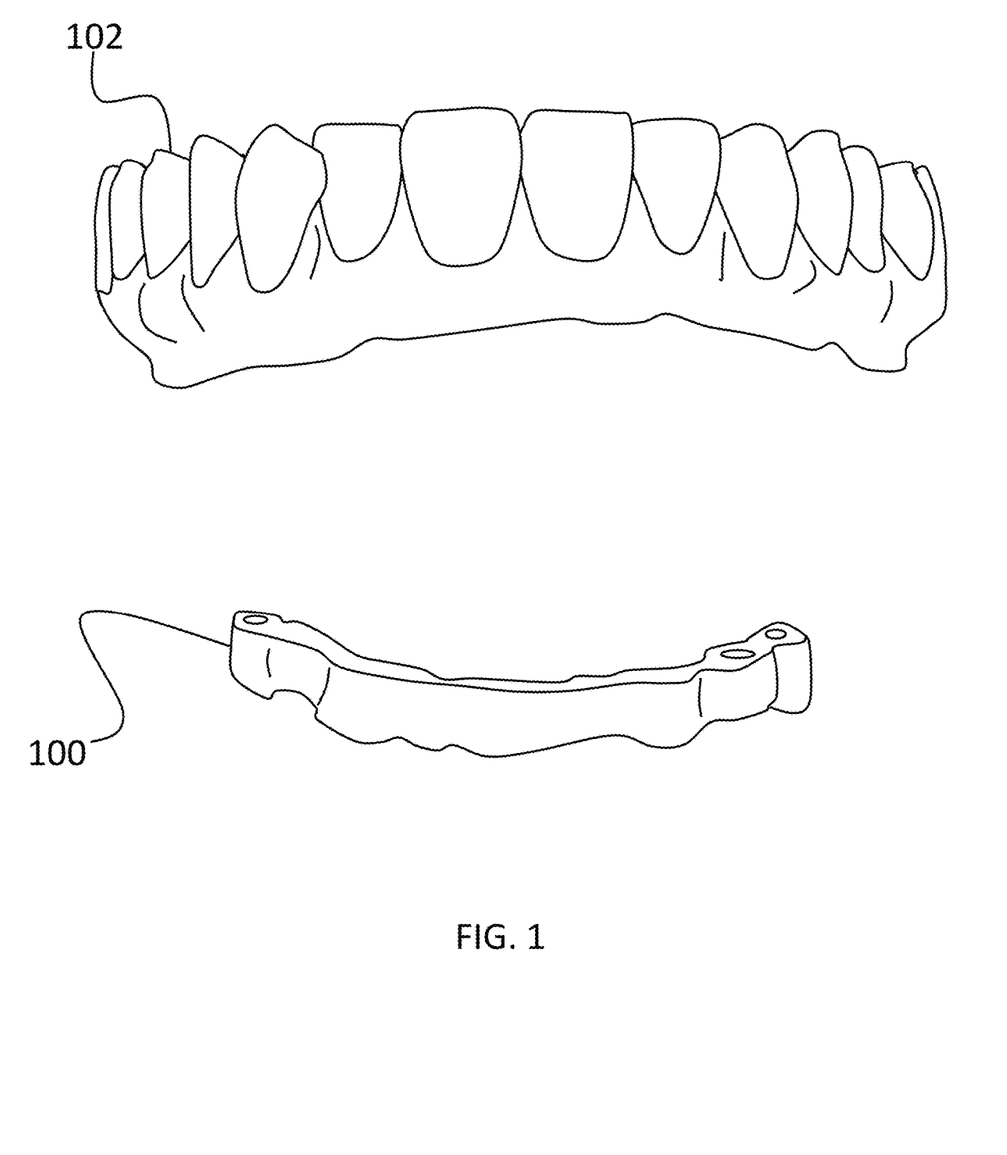
FIG. 1 is an illustration depicting a primary substructure and a secondary superstructure according to various embodiments of the present invention.
Figure 2:
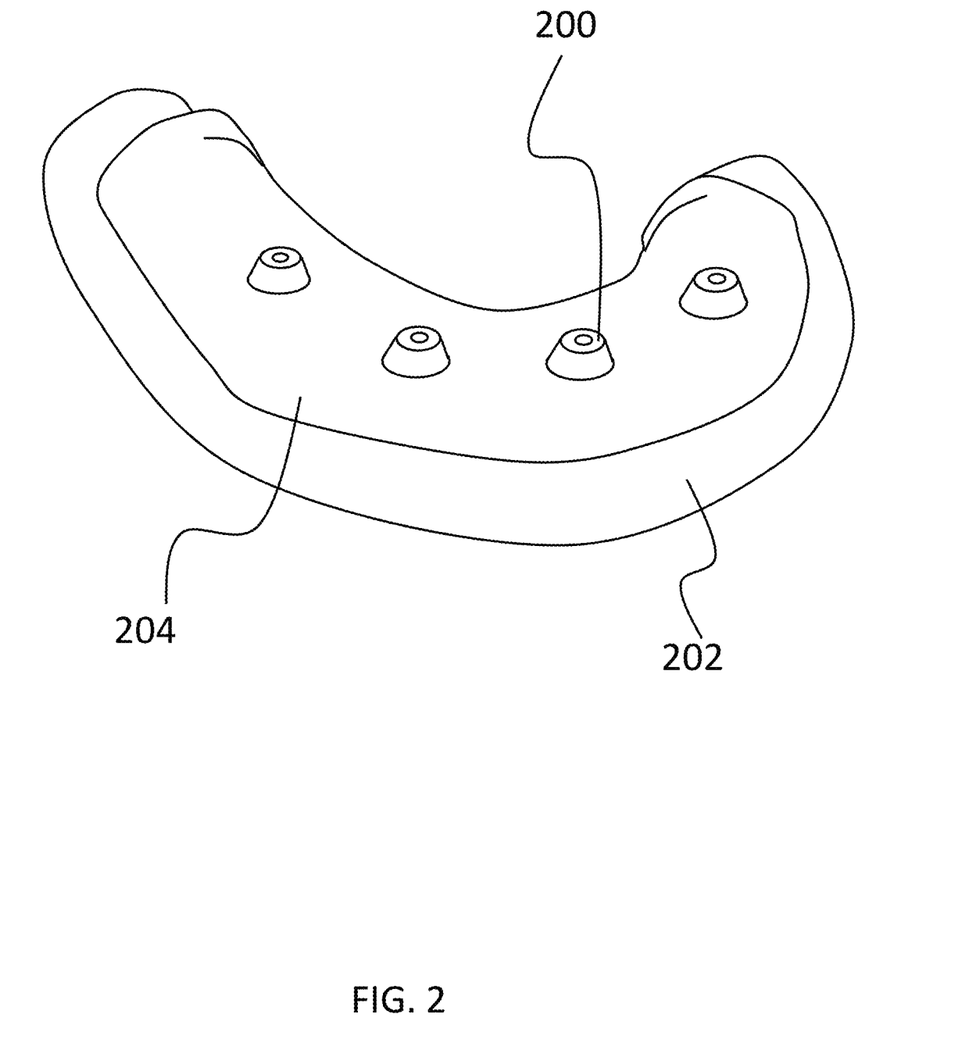
FIG. 2 is an illustration depicting a dental implant as affixed with a patient's jaw.

The present invention is directed to a dental implant prosthesis. Specifically, the invention is a two-part, screw retained implant supported prosthesis. As shown in FIG. 1, the prosthesis includes a primary substructure 100 and a secondary superstructure 102. To affix the prosthesis with a patient, the substructure is screwed onto an implant which is pre-affixed in a patient's jaw (by a surgeon or other individual). For example and as shown in FIG. 2, dental implants 200 need to be affixed with a patient's jawbone 202 by a surgeon, dentist, etc. The dental implants 200 are accessible through the patient's gums 204 to provide for access and allow a technician or other individual to affix the primary substructure with the dental implants 200. Thus, the dental implants 200 provide the base upon which the prosthesis is attached.

Figure 3:
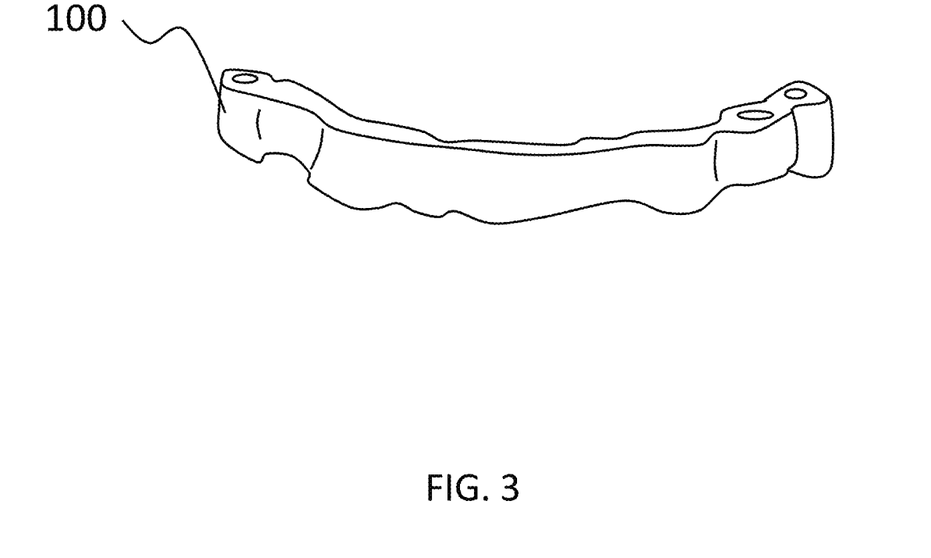
FIG. 3 is a front-view illustration of a primary substructure that can be screwed onto the implant as illustrated in FIG. 2.
Figure 4:
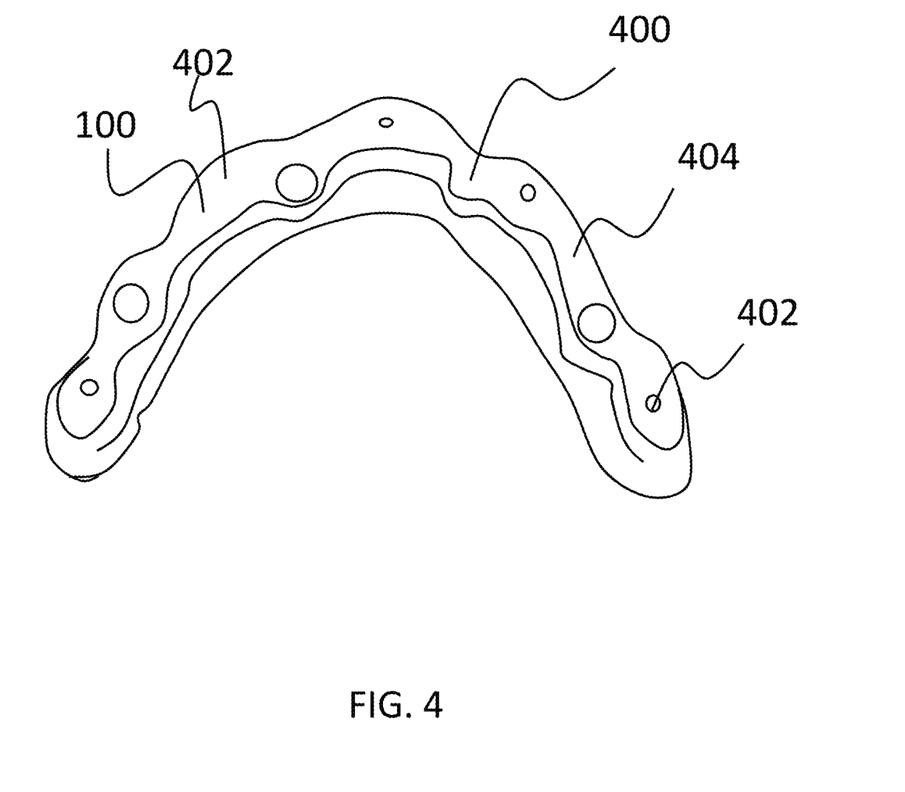
FIG. 4 is a top-view illustration of the primary substructure.
Figure 5:
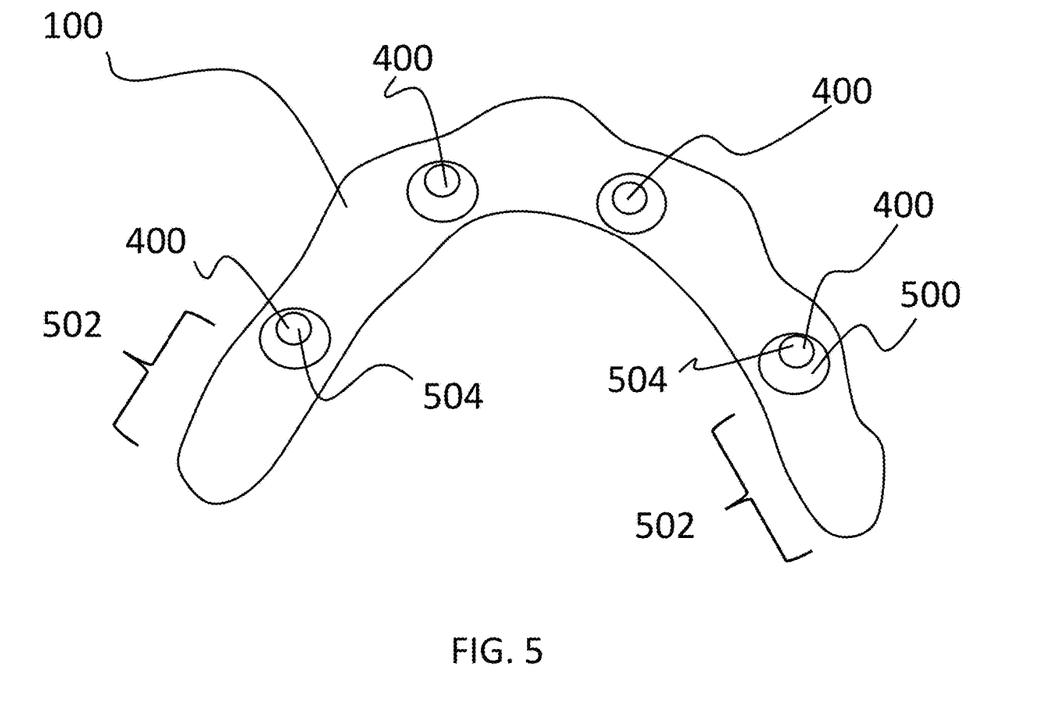
FIG. 5 is a bottom-view illustration of the primary substructure.

As noted above and as shown in FIGS. 3 through 5, the primary substructure 100 provides a stable base upon which the secondary superstructure is affixed. More specifically, FIGS. 3 through 5 depict front, top, and bottom views, respectively, of the primary substructure 100. The primary substructure 100 is formed of any suitably stable and biocompatible material. Desirably, the primary substructure 100 is formed of titanium as a titanium bar substructure. Further, the actual shape and size of the primary substructure 100 is desirably dictated by the shape of the patient's mouth and jaw (via, for example, a scan). As a non-limiting example, the primary substructure 100 is formed to have the following dimensions:
  a. Range: 2-6 mm (height)×3-7 mm (width)×8-12 mm (cantilever)
  b. Height: desirably 4 mm
  c. Width: desirably 5 mm
  d. Cantilever: on the posterior teeth ideal is 10 mm
  e. Desired dimensions: 4 mm×5 mm×10 mm Notably and as shown in FIGS. 4 and 5, the primary substructure 100 is formed such that substructure holes 400 pass through the substructure 100. Optionally and as shown in FIG. 5, the bottom side of the primary structure 100 includes recessions 500 surrounding the substructure holes 400. The recessions 500 are formed to accommodate the implants (i.e., depicted as element 200 in FIG. 2) and align the substructure holes 400 with the implants.

Further, FIG. 4 illustrates the fixture holes 402 that are formed within a top side 404 of the primary substructure 100. Each fixture hole 402 includes threading or any other suitable shape or marking that allows a screw (or other attachment means) to be firmly affixed with the fixture hole 402. For example, the fixture holes 402 are threaded holes formed to receive a screw that is passed through the secondary superstructure. In other words, the secondary superstructure is affixed with the primary substructure by securing a screw through the superstructure and into the primary substructure.

Also of note is the cantilevered section 502 that extends beyond the substructure holes 400 (i.e., beyond the most peripheral holes 504) such that the primary substructure 100 ends with a pair of extended cantilevered sections 502. Because of the strength of titanium, the cantilevered sections 502 provide a broad stable base for the superstructure as described in further detail below.

Figure 6:
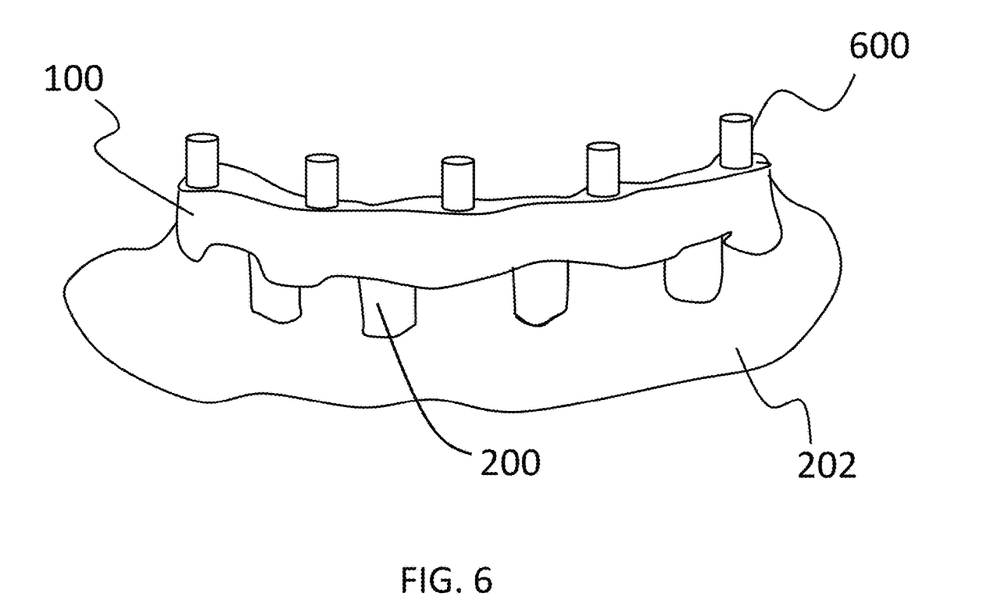
FIG. 6 is an illustration depicting the primary substructure as positioned over the dental implant, also showing titanium inserts that are affixed with a secondary superstructure.
Figure 7:
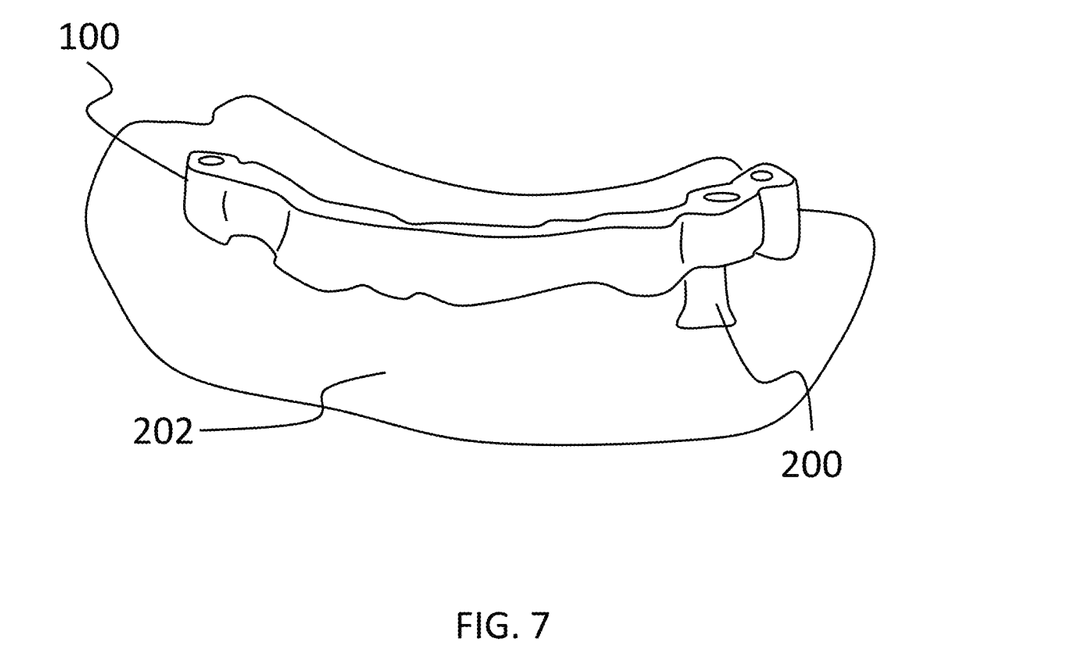
FIG. 7 is an illustration depicting the primary substructure as positioned over the dental implant.
Figure 8:
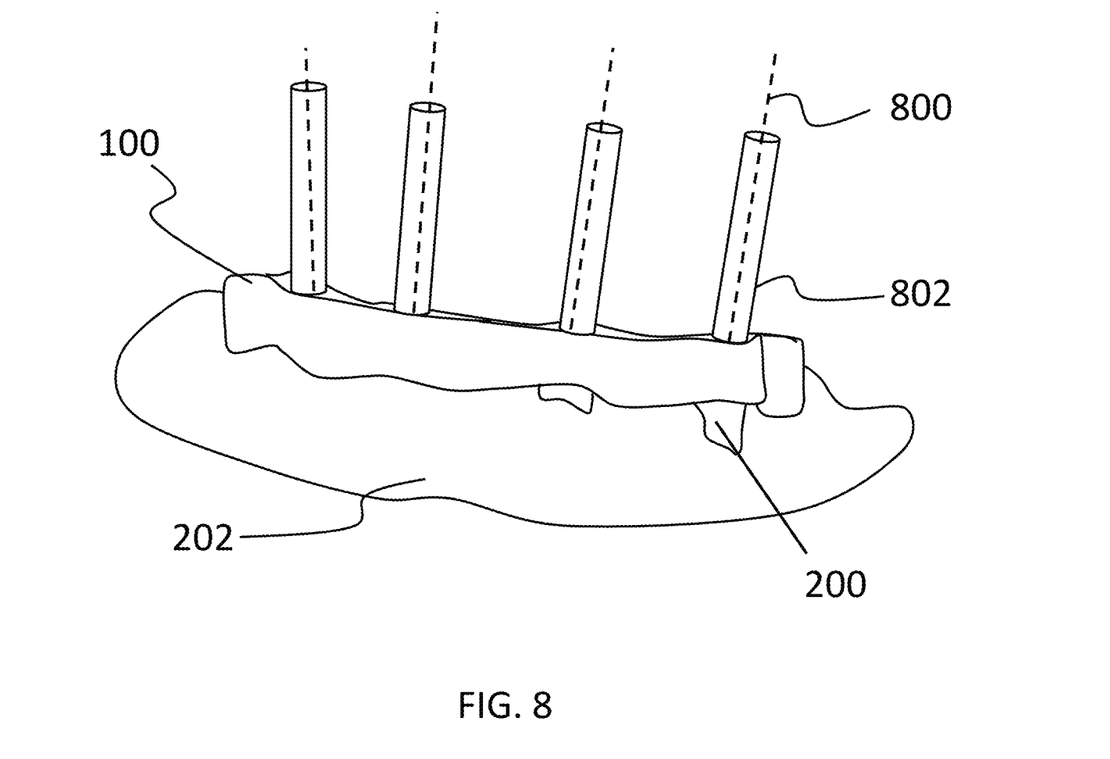
FIG. 8 is an illustration depicting the primary substructure as positioned over the dental implant, showing screws as being used to affix the primary substructure with the dental implant.

For further understanding, FIGS. 6 through 8 depict the primary substructure 100 as affixed with the dental implants 200 and, thereby, the patient's jaw 202. It should be noted that FIG. 6 depicts inserts 600 that are positioned within the superstructure during formation or installation. However, for illustrative purposes, the inserts 600 are depicted in FIG. 6 to show the relative position of the inserts 600 with respect to the primary substructure 100.

Additionally and as shown in FIG. 8, use of the titanium primary substructure 100 allows for compensation of non-ideal implant angulations. An ideal implant angle is, for example, an orthogonal projection (having a linear axis 800) based off the tooth position; the angulation is determined by bone anatomy and tooth position. In many situations, the angulation is off because of the bone anatomy. The dental implant prosthesis as described herein can correct a non-ideal implant angulation through use of the initial primary substructure 100, which includes fixture holes (described below) that can be formed at any desired angle, including an ideal implant angle such as ninety degrees off the tooth position or at any other desired angle (such as tipped forward slightly towards the user's face, etc.).

In other words, each patient's jaw is different and when the implants 200 are surgically affixed with the patient's jaw 202, the linear axis 800 of each implant 200 could possibly be at different angles from one another. For example, the cylinders depicted in FIG. 8 are generically representative (although not to scale or shape) of screws 802 that are used to affix the primary substructure 100 against the implants 200. However, in this non-limiting example, it is clear that the linear axis 800 passing through each screw 802 in order to align with the related implant 200 is at a different angle. Thus, use of the primary substructure 100 allows a technician to screw the different screws 802 through the primary substructure 100, along the relevant linear axis 800, and into corresponding implants 200. In doing so, the primary substructure 100 then operates as a stable and uniform base to provide ideal angulations (via, for example, fixture holes) for securing the ultimate secondary superstructure against the patient's jaw 202. Ideal angulations allow the secondary superstructure to be easily removed by a technique for cleaning, maintenance, etc., whereas the non-ideal implant angulations render any fixture more difficult to work with.

Figure 9:
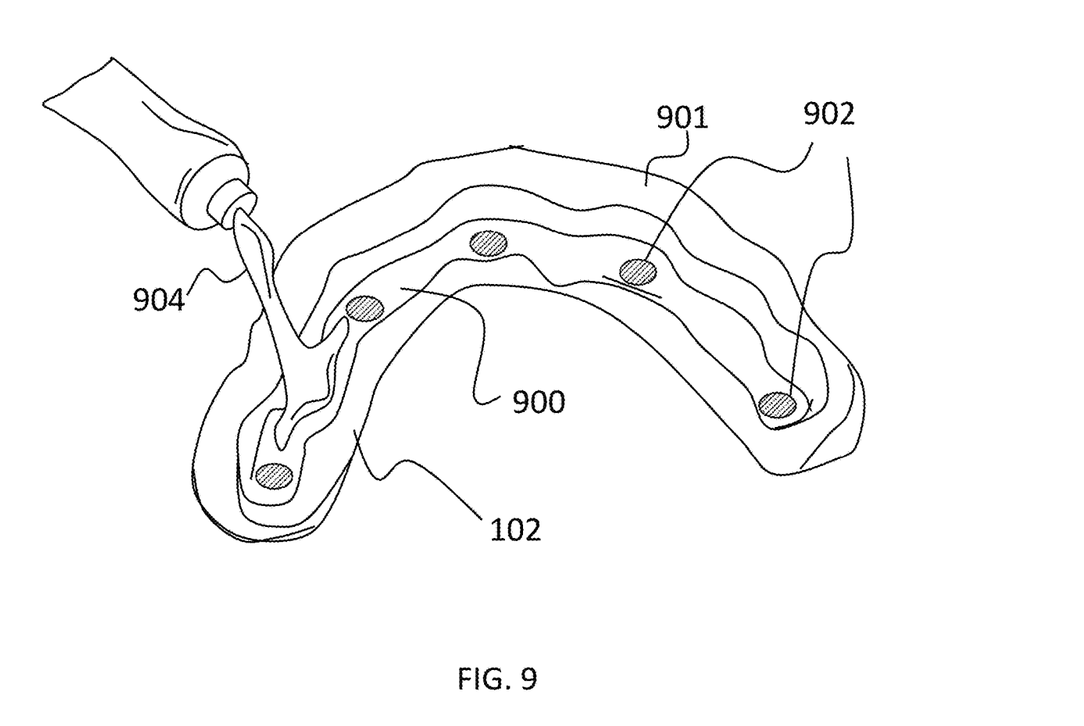
FIG. 9 is bottom-view illustration of the secondary superstructure.

With the primary substructure 100 secured against the implants 200, the secondary superstructure 102 can then be secured against and supported by the primary substructure 100. FIG. 9 provides a bottom-view of the secondary superstructure 102. The secondary superstructure 102 is formed of any suitably durable material, a non-limiting example of which includes zirconia. Thus, in one embodiment, the secondary superstructure 102 is a screw retained zirconia superstructure. The secondary superstructure 102 is the external and visible part of the restoration that is formed to simulate a user's teeth. It can be molded or, in another aspect, milled with CAD/CAM (computer-aided design and computer-aided manufacturing) technology. The secondary superstructure 102 may optionally have layered feldspathic porcelain facially to improve esthetics.

It should also be noted that the bottom side 901 of the secondary superstructure 102 may include a recession or channel 900 that is formed to fit over the primary substructure. Further, a series of superstructure holes 902 are formed through the secondary superstructure 102 to allow for screws to pass through the superstructure holes 902 and into the fixture holes (depicted as element 402 in FIG. 4).

To prevent the secondary superstructure 102 from cracking, inserts (depicted as element 600 in FIG. 6) are fixed with the superstructure holes 902. As a non-limiting example, titanium cylindrical inserts (sleeves) are cemented within the zirconia superstructure 102 (i.e., within the superstructure holes 902) to allow attachment to the primary substructure (e.g., titanium bar). In other words, the titanium inserts allow a technician to tighten (via screws positioned through the inserts) the secondary superstructure 102 firmly against the primary substructure 100 without cracking or damaging the superstructure 102 (as it is desirably formed of zirconia).

During installation, a technician may optionally position an adhesive 904 onto either the secondary superstructure 102 or the primary substructure (or both) to seal the two structures together and avoid infiltration between the two structures. The adhesive is any suitable adhesive for oral applications, a non-limiting example of which includes a temporary polymer cement. For example, in the case of a temporary polymer cement, a dentist can remove 904 and replace the adhesive every six to twelve months (or at any other suitable duration).

Figure 10:
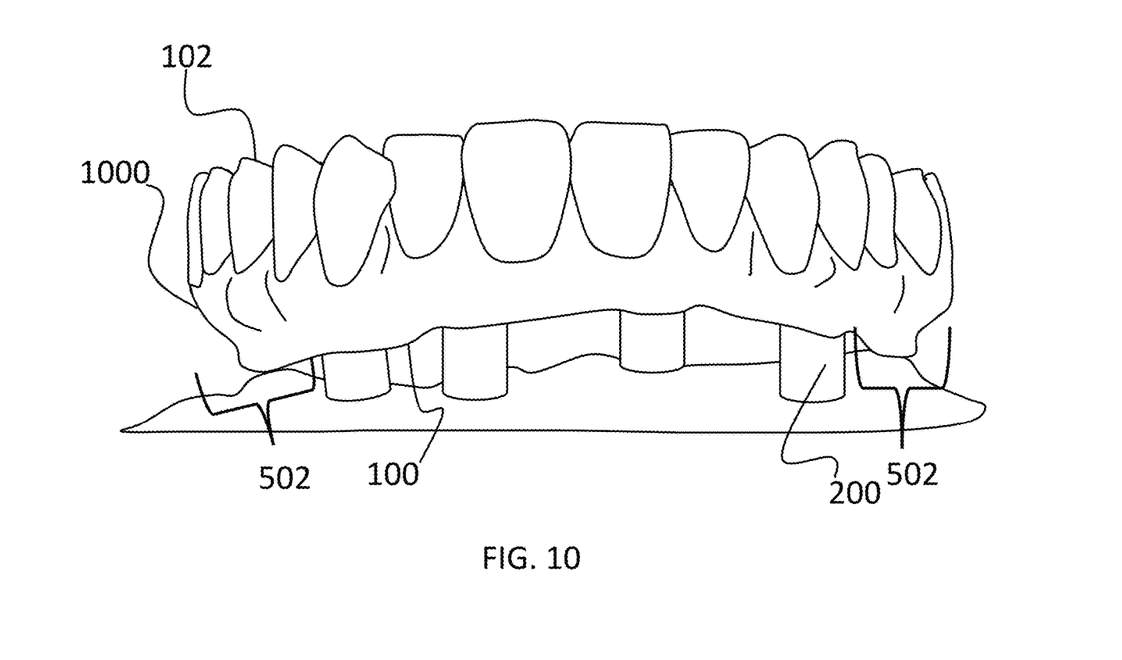
FIG. 10 is a front-view illustration depicting the secondary superstructure as affixed with the primary substructure.

FIG. 10 illustrates the assembled and installed prosthesis, showing the primary substructure 100 affixed against the implants 202, with the secondary superstructure 102 affixed on top of the substructure 100. Of note are the cantilevered sections 502, which provide a strong and stable support for the adjacent molar portions 1000 of the secondary superstructure 102 (which decreases the likelihood of cracking due to intense chomping and chewing action of a patient).

Given the descriptions above and the drawings as submitted herewith, one skilled in the art can appreciate that the dental implant prosthesis according to the principles of the present invention provides several advantages over the prior art. For example, the combination materials (e.g., Titanium and zirconia) provide maximum strength. The cantilever sections provide enhanced support for the corresponding molar portions of the superstructure. The use of the substructure allows for compensation of non-ideal implant angulations. Further, the use of the substructure allows surgeons to place implants in limited one availability so that a lab and/or dentist can fabricate restorations which otherwise would not be able to be fabricated. Additionally, through the use of CAD/CAM, the restoration is retrievable, meaning that if something, breaks (e.g., the superstructure is cracked) it can be prefabricated very easily. Finally, the combined substructure and superstructure allows a dentist to easily and reliably produce an aesthetic restoration.

What is claimed is:

1. A method for implanting a dental implant prosthesis, comprising acts of:
   affixing a primary substructure with at least four dental implants as affixed at dissimilar angles in a patient's jaw, the primary substructure having a top side and a bottom side such that a height between the top side and bottom side is between two and six millimeters, with at least four substructure holes formed at the dissimilar angles passing through the primary substructure from the top side to the bottom side, such that the primary substructure is affixed with the dental implants using screws that passes through the substructure holes and into the dental implants at the dissimilar angles, such that one of the dissimilar angles is an orthogonal projection from the patient's jaw, wherein the primary substructure has a width of between 3 and 7 millimeters; and
   affixing a secondary superstructure having superstructure holes formed therethrough with the primary substructure by positioning a temporary polymer cement between the primary substructure and the secondary superstructure and screwing the secondary superstructure to the primary substructure through the superstructure holes, the secondary superstructure being formed through molding or milling with computer-aided design and computer-aided manufacturing technology and being shaped to simulate the patient's teeth, whereby the primary substructure is affixed with the dental implants, with the secondary superstructure thereafter being affixed with the primary substructure.

2. The method as set forth in claim 1, wherein the primary superstructure is formed of titanium and the secondary superstructure is formed of zirconia and layered with feldspathic porcelain.

3. The method as set forth in claim 1, wherein the secondary superstructure has superstructure holes passing therethrough, and further comprising an act of affixing a titanium insert in one or more of the superstructure holes.

4. The method as set forth in claim 1, wherein the secondary superstructure has superstructure holes passing therethrough, and wherein the substructure holes passing through the primary substructure include at least two peripheral holes, and wherein the primary substructure includes a pair of extended cantilevered sections that extend between 8 and 12 millimeters beyond the two peripheral holes, and wherein a fixture hole is formed in each cantilevered section, such that affixing the secondary superstructure with the primary substructure further comprises an act of positioning a screw through at least one of the superstructure holes and into at least one of the fixture holes.

* * * * *